Patented Jan. 25, 1944

2,340,108

UNITED STATES PATENT OFFICE 2,340,108

SYNTHETIC RUBBERLIKE COMPOSITION

Gaetano F. D'Alelio, Pittsfield, Mass., assignor to General Electric Company, a corporation of New York No Drawing. Original application December 1, 1939, Serial No. 307,144. Divided and this application May 30, 1942, Serial No. 445,193

5 Claims. (Cl. 260—36)

This invention relates to the production of synthetic rubber-like compositions and more particularly is directed to the preparation of such compositions of the class comprising polyvinyl halides, specifically polyvinyl chloride.

The present application is a division of my copending application Serial No. 307,144, filed December 1, 1939, now Patent 2,297,290, which application is a continuation-in-part of my co-pending applications Serial Nos. 294,493, 294,494, 294,495, 294,496 and 294,497, now Patents 2,279,881; 2,279,882; 2,279,883; 2,279,884; and 2,279,885, respectively, which applications were filed September 12, 1939, and of Serial No. 302,169, filed October 31, 1939, now Patent 2,310,731. All of these applications are assigned to the same assignee as the present invention.

Synthetic rubber-like compositions may be made from polyvinyl halides, such as polyvinyl chloride, by plasticizing the halogenated vinyl compound with a material which is substantially non-volatile at elevated temperature. A plasticizer heretofore widely used for softening polyvinyl halides is tricresyl phosphate. Although polyvinyl chloride plasticized with tricresyl phosphate yields satisfactory products for most applications, films produced therefrom discolor at elevated temperatures and lose their flexibility. Moreover, at elevated temperatures such films show little or no strength.

I have discovered that esters of itaconic acid act as plasticizers for polyvinyl halides such as, for example, polyvinyl chloride, and impart to such compositions a marked stabilizing effect at elevated temperatures. Films or thin sheets prepared from such compositions are clear, almost colorless or of a light yellow color, flexible, tough, have considerable elasticity and excellent tensile strength.

In order that those skilled in the art better may understand how the present invention may be carried into effect, the following illustrative examples thereof are given. All parts are by weight.

*Example 1*

| | Parts |
|---|---|
| Polyvinyl chloride | 150 |
| Dibenzyl itaconate | 54 | were blended at 130° C. to a uniform consistency and thereafter molded under pressure at about 145° C. to form a disk about $\frac{1}{16}$ inch thick. The disk was of such flexibility that it could be folded back upon itself or rolled into the form of a tube, at room temperature, without cracking. In general, it had the flexibility characteristics of soft rubber of similar thickness. It was light yellow in color and of such transparency that ordinary newsprint could be read through it without difficulty. It was very tough and had considerable elasticity.

When 54 parts tricresyl phosphate were similarly incorporated into 150 parts of polyvinyl chloride and the resulting mass molded into the form of a $\frac{1}{16}$"-thick disk as above described, the disk had relatively slight flexibility, breaking into two pieces when effort was made to fold it back upon itself. The disk was highly discolored, being of a dark greenish-brown, and scarcely could be seen through when held before a strong light.

*Example 2*

Same as Example 1 with the exception that di-(isobutyl) itaconate was employed. An exceptionally clear, flexible molded disk was obtained.

*Example 3*

Same procedure and proportions of components as described under Example 1, with the exception that di(butoxy ethyl) itaconate was used. The molded disk was clear, soft and of good flexibility.

*Example 4*

The same technique was followed as in Example 1 using, however, 29.7 parts di-(cyclohexyl) itaconate instead of 54 parts dibenzyl itaconate. A clear molded disk, having approximately the same hardness as the tricresyl-phosphate-plasticized polyvinyl chloride described under Example 1, was obtained.

*Example 5*

Same as Example 1, but using 45.9 parts di-(phenyl ethyl) itaconate in place of 54 parts dibenzyl itaconate. A clear, flexible, strong molded disk was obtained.

*Example 6*

Same as Example 1, but using 40.5 parts diphenyl itaconate instead of 54 parts dibenzyl itaconate. A very clear, fairly hard, molded disk was produced by molding the homogeneous mixture of components under heat and pressure.

*Example 7*

| | Parts |
|---|---|
| Polyvinyl chloride | 100 |
| Dihexyl itaconate | 13 |
| Di-(isoamyl) itaconate | 57 | were intimately milled under heat, as by sheeting on hot rolls for 5 minutes at a temperature corresponding to 60 pounds steam pressure, yielding a tough, rubbery sheet of plasticized polyvinyl chloride.

Example 8

|  | Parts |
| --- | --- |
| Polyvinyl chloride | 164 |
| Dihexyl itaconate | 13 |
| Di(isoamyl) itaconate | 57 | were first sheeted as described under Example 1. The sheeted, plasticized polyvinyl chloride was molded at about 130° C. under a pressure of approximately 2000 pounds per square inch. The molded article was flexible, resilient, transparent, tough and of a yellowish color.

It will be understood, of course, that my invention is not limited to the particular itaconic esters given in the above illustrative examples as plasticizers of polyvinyl halides such as polyvinyl chloride. For example, instead of using mixtures of dihexyl itaconate and di-(isoamyl) itaconate as described under Examples 7 and 8, either of these itaconic esters alone has a beneficial plasticizing effect upon polyvinyl chloride. Dimethyl and diethyl itaconates also are good plasticizers for polyvinyl halides, but for applications where the plasticized material may be exposed to high temperatures, for example in electrically insulating applications, their use is less desirable because of their greater volatility as compared with the higher molecular weight itaconic esters. Itaconic esters of saturated or unsaturated aliphatic monohydric alcohols containing a large number of carbon atoms, for example 10 or more, in the ester radical also may be used, but in general such high molecular weight itaconic esters are less desirable because of the long milling or compounding time required in order to obtain a uniform distribution of such itaconic esters throughout the mass of polyvinyl halide.

For the above reasons I prefer that my new plastic compositions comprise polyvinyl halide, e. g. polyvinyl chloride, plasticized with an itaconic ester containing not less than three and not more than nine carbon atoms in the ester radical, if such radical be an aliphatic radical; or not less than six and not more than fifteen carbon atoms in the ester radical, if such radical be a carbocyclic radical. The carbocyclic itaconic esters have been found to be especially well adapted for plasticizing polyvinyl halides and are the preferred itaconic esters employed in practicing this invention. Examples of carbocyclic itaconic esters are the symmetrical cyclo-aliphatic itaconic esters, the symmetrical aromatic itaconic esters and the mixed or unsymmetrical carbocyclic itaconic esters such as itaconic esters containing one aromatic and one cyclo-aliphatic ester radical.

Examples of other itaconic esters which may be incorporated into polyvinyl halides, either singly or a plurality thereof, are disclosed in my above-identified copending applications. Thus, the itaconic ester may be, for instance one in which one or both ester groups contain saturated or unsaturated, straight- or branched-chain, normal or isomeric aliphatic hydrocarbon radicals; or, it may be one in which one or both ester groups is the radical of a substituted monohydric alcohol, that is, a symmetrical or an unsymmetrical itaconic ester of a polyhydric alcohol in which all but one hydroxyl group has been replaced by a substituent group, examples of which esters are mono- and di-(methoxy ethyl) itaconates, mono- and di-(beta chlorethyl) itaconates, mono- and di-(beta acetoxy ethyl) itaconates, etc. Additional examples of carbocyclic itaconic esters, that is, itaconic esters in which at least one ester group contains a carbocyclic structure, which may be used in producing these new synthetic, rubber-like compositions are mono-phenyl itaconate, methyl phenyl itaconate, ethyl cyclohexyl itaconate, mono- and di-(para chlorphenyl) itaconates, mono- and di-(naphthyl) itaconates, mono- and di-(phenoxy ethyl) itaconates, mono- and di(cresyl) itaconates, mono- and di-(ortho-methyl cyclohexyl) itaconates, etc.

Usually the itaconic esters as incorporated into the polyvinyl halide are in monomeric form. However, itaconic esters which are fluid or plastic masses when partly or substantially completely polymerized also may be compounded with polyvinyl halides in order to plasticize the latter. The itaconic ester may be incorporated into the polyvinyl halide by simple mechanical agitation or by the use of mutual solvents, followed by the standard mechanical processes known to the plastics art. These bodies then may be subjected to heat treatment or to heat and pressure treatment if desired. The compounding of the polyvinyl halide with the itaconic ester may be carried out in the presence or absence of a polymerization catalyst such as benzoyl peroxide (additional examples of polymerization catalysts are given in my above-identified copending applications) when the monomeric or partially polymerized forms of the itaconic esters are employed.

Not only polyvinyl chloride but also polyvinyl bromide and iodide may be plasticized by incorporating therein an itaconic ester or esters. Compositions comprising polyvinyl iodide should be avoided where resistance to discoloration at elevated temperatures is important. Polyvinylidene halides also may be plasticized with an ester or esters of itaconic acid.

In certain cases, instead of modifying the polyvinyl halide with an ester of itaconic acid, it may be desirable to incorporate into the polyvinyl halide in order to produce a synthetic composition best adapted to meet a particular service application homologous itaconic esters such as methyl itaconic esters,

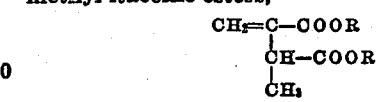

dimethyl itaconic esters,

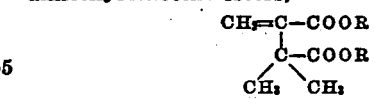

ethyl itaconic esters,

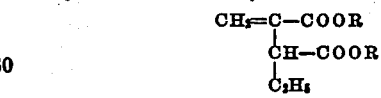

or, in general, itaconic esters having the graphic formula

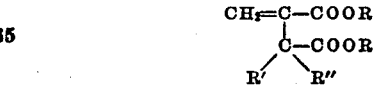

where R is an aliphatic or a carbocyclic radical or derivatives of such radicals containing substituent groups and R' and R" are either hydrogen or R. The term "itaconic ester" as used generally herein and in the appended claims therefore is intended to include within its meaning not only the normal itaconic esters but also the homologous itaconic esters.

In producing these new synthetic compositions varying amounts of itaconic ester may be incorporated into the polyvinyl halide, depending, for example, upon the particular starting materials employed and the particular properties desired in the end-product. Ordinarily, however, the proportion of itaconic ester does not exceed 60 per cent by weight of the whole and in most cases is considerably less, for example from 10 to 50 per cent by weight of the mixed components.

The synthetic compositions of this invention are especially adapted for use as electrical insulation in producing insulated electrical conductors and cables. Substances adapted to improve the electrical properties of plasticized polyvinyl halides at elevated temperatures may be incorporated into the compositions prior to use as electrical insulation. Examples of such substances are given in Patents 2,118,017—Moyer M. Safford, issued May 17, 1938, and 2,171,334—Raymond M. Fuoss, issued August 29, 1939, both of which patents are assigned to the same assignee as the present invention. For most electrically insulating applications the consistency of the mass at an elevated temperature, e. g. at 100° to 175° C., should be such that it can be extruded upon a solid or stranded conductor such as copper wire. The new synthetic rubber-like electrical insulation may be used in conjunction with other insulation such as cellulose derivatives, e. g., cellulose esters such as cellulose acetate, etc., cellulose ethers such as ethyl cellulose, etc., regenerated cellulose, etc., or with rubber, chloroprene, asbestos, varnished cambric, polyvinyl acetals, e. g., polyvinyl formal, etc., alkyd resins, acrylic and alkacrylic esters, etc.

Molded articles of manufacture, e. g., electrical outlet boxes, electrical conduits, etc., also may be made from the modified or unmodified synthetic compositions of this invention. As modifying agents various fillers may be used, for example, wood flour, alpha flock, sand, asbestos, mica, paper, cloth, cellulose derivatives, natural and synthetic filaments or fibers, etc., in continuous, shredded or comminuted form. Pigments, dyes, opacifiers, mold lubricants, etc., likewise may be added as modifying agents. Polyvinyl halide, specifically polyvinyl chloride, plasticized with an itaconic ester or esters also may be used in the production of liquid coating compositions.

What I claim as new and desire to secure by Letters Patent of the United States is:

1. A composition comprising (1) a compound of the class consisting of polyvinyl halides and polyvinylidene halides and (2) di-(cyclohexyl) itaconate.
2. A composition comprising a polyvinyl halide and di-(cyclohexyl) itaconate.
3. A composition comprising polyvinyl chloride and di-(cyclohexyl) itaconate.
4. A composition comprising a polyvinylidene halide and di-(cyclohexyl) itaconate.
5. A composition comprising polyvinylidene chloride and di-(cyclohexyl) itaconate.

GAETANO F. D'ALELIO.